US006782904B2

(12) United States Patent
Tien

(10) Patent No.: US 6,782,904 B2
(45) Date of Patent: Aug. 31, 2004

(54) EXTENDIBLE RAIN SHIELD FOR VEHICLE

(76) Inventor: Tseng Ping Tien, No. 20, Li Fen Road, Chong Ho Tsuen, Ho Li Hsiang, Taichung Hsien (TW), 421

(*) Notice: Subject to any disclaimer, the term of this patent is extended or adjusted under 35 U.S.C. 154(b) by 12 days.

(21) Appl. No.: 10/287,262

(22) Filed: Nov. 4, 2002

(65) Prior Publication Data
US 2004/0084072 A1 May 6, 2004

(51) Int. Cl.[7] .................................................. E04H 15/06
(52) U.S. Cl. ........................... 135/88.07; 248/88.01; 248/88.11; 248/88.12; 296/98; 296/154; 160/22; 160/66; 160/DIG. 4
(58) Field of Search ..................... 135/88.07, 88.1, 135/88.11, 88.12, 88.14; 296/152, 154, 213, 99.1, 98, 136.01, 163; 160/22, 66, 69, 370.22, DIG. 4

(56) References Cited
U.S. PATENT DOCUMENTS 4,848,827 A * 7/1989 Ou ............................ 296/99.1
5,409,284 A * 4/1995 Mahler ....................... 296/97.4
5,443,300 A * 8/1995 Mohammed ................ 296/97.4
5,638,884 A * 6/1997 Lin .......................... 160/370.22
5,653,278 A * 8/1997 Cheng ...................... 160/370.22
6,056,350 A * 5/2000 Brutsaert ..................... 296/163
6,152,516 A * 11/2000 Williams ....................... 296/98
6,213,137 B1   4/2001 Wang ......................... 135/20.3
6,250,321 B1 * 6/2001 Ernst ......................... 135/88.11
6,668,902 B2 * 12/2003 Bong ........................ 160/370.22

* cited by examiner

Primary Examiner—Leslie A. Braun
Assistant Examiner—Amy J. Sterling
(74) Attorney, Agent, or Firm—Charles E. Baxley

(57) ABSTRACT

A rain shield device includes a housing for attaching onto various vehicles, and a shield extendible out of the housing for shielding the upper portions of the doors of the vehicles and for allowing the drivers and the passengers to easily open or receive the umbrella while boarding or moving out of the vehicles. The shield may be extended out of the housing with two links and two racks and a motor. A shaft is rotatably received in the housing for winding and receiving the shield, and may be rotated relative to the housing by a motor.

6 Claims, 6 Drawing Sheets

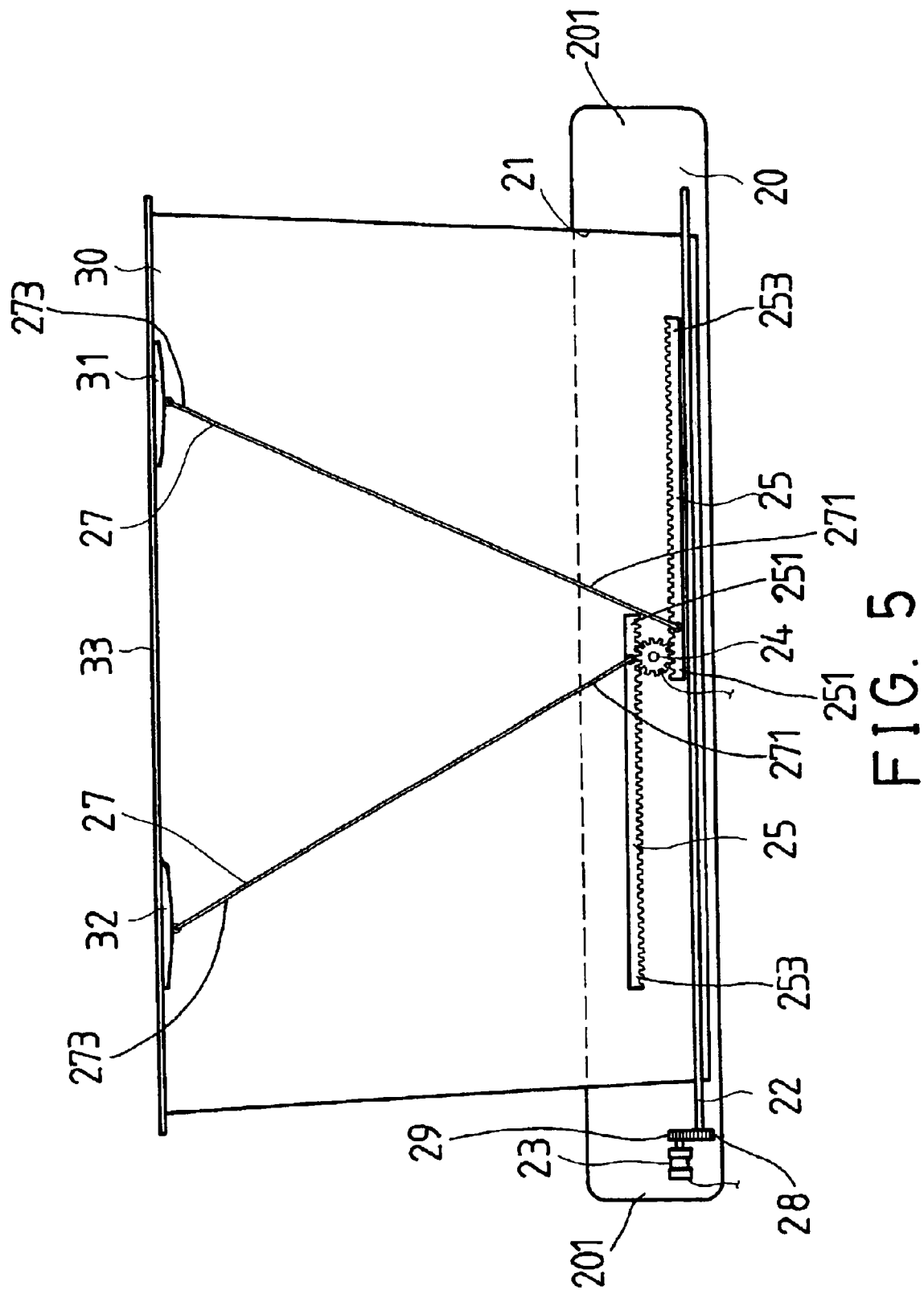

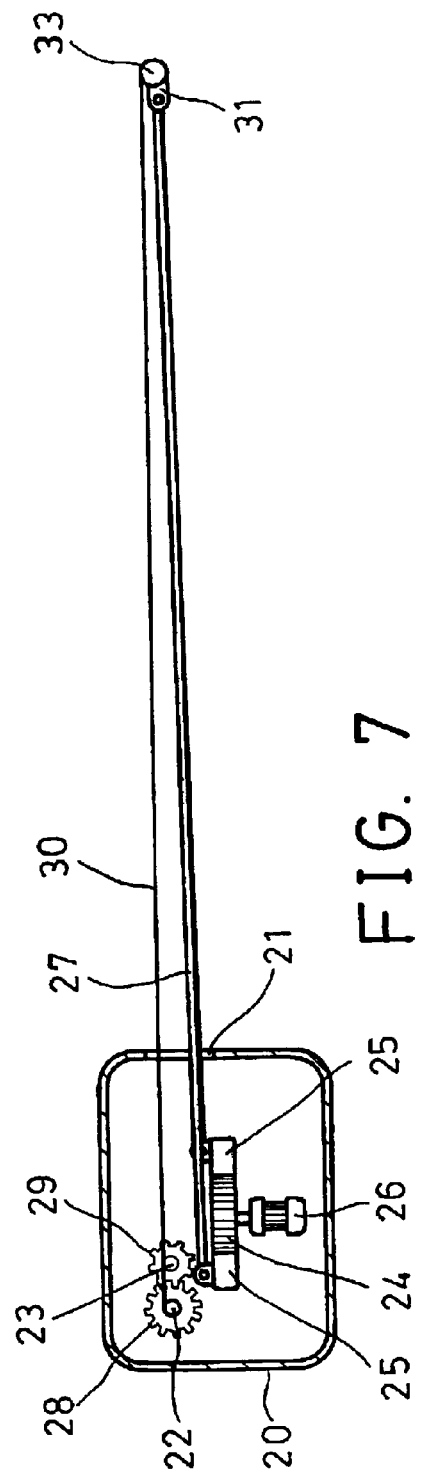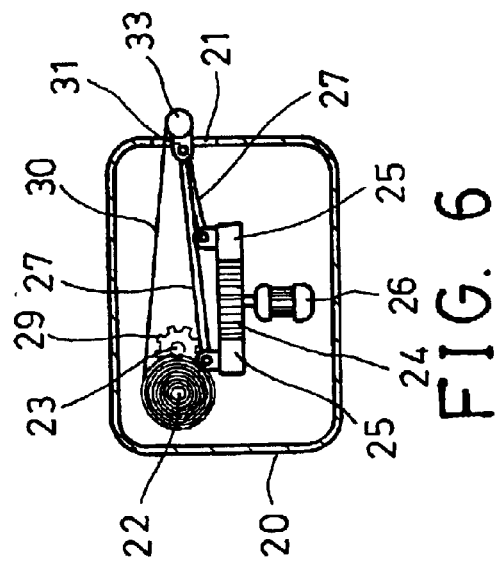

EXTENDIBLE RAIN SHIELD FOR VEHICLE

BACKGROUND OF THE INVENTION

1. Field of the Invention

The present invention relates to a rain shield, and more particularly to an extendible rain shield device for attaching onto various vehicles.

2. Description of the Prior Art

Typically, while raining, both the vehicle drivers and the passengers may be seriously wetted by the rain when both boarding into or moving out of the vehicles.

Particularly, while boarding the vehicles and when the doors of the vehicles are opened, the drivers or the passengers may also be wetted by the rain after the umbrella is enclosed and received into the vehicles.

On the contrary, while moving out of the vehicles and when the doors of the vehicles are opened, the drivers or the passengers may also be wetted by the rain before the umbrella is opened and moved out of the vehicles.

The present invention has arisen to mitigate and/or obviate the afore-described disadvantages of the conventional rain shields.

SUMMARY OF THE INVENTION

The primary objective of the present invention is to provide an extendible rain shield device for easily and readily attaching onto various vehicles.

The other objective of the present invention is to provide an extendible rain shield device including a shade extendible outwardly from a housing for shielding the upper portions of the doors of the vehicles, and for shielding the rain while boarding or moving out of the vehicles, and for allowing the drivers and the passengers to easily open or receive the umbrella.

In accordance with one aspect of the invention, there is provided a rain shield device comprising a housing for easily and readily attaching onto various vehicles and including a groove formed therein, a shield, and an extending device for extending the shield out through the groove of the housing. The shade may be extended out of the housing for shielding the upper portions of the doors of the vehicles, and for shielding the rain while boarding or moving out of the vehicles, and for allowing the drivers and the passengers to easily open or receive the umbrella.

The shield includes an outer portion, the extending device includes a pair of links each having a first end attached to the outer portion of the shield and movable out of the housing, and a second end received in the housing.

The extending device includes a pair of racks slidably received in opposite sides of the housing, the second ends of the links are coupled to first ends of the racks respectively and located close to ends of the housing, the extending device further includes a moving device for moving the racks to the other sides of the housing and to move the links and the outer portion of the shield out of the housing.

The moving device includes a gear engaged between the racks, and a motor coupled to the gear for rotating the gear to move the racks from housing ends to the other ends.

The housing includes a shaft rotatably received therein for winding and receiving the shield on the shaft. A rotating device may further be provided for rotating the shaft to wind the shield onto the shaft.

For example, the rotating device includes a motor coupled to the shaft and to rotate the shaft, and includes a first pinion secured to the shaft, and a second pinion attached to the motor and engaged with the first pinion for rotating the shaft by the motor via the first and the second pinions.

Further objectives and advantages of the present invention will become apparent from a careful reading of a detailed description provided hereinbelow, with appropriate reference to accompanying drawings.

BRIEF DESCRIPTION OF THE DRAWINGS

FIG. 5 is a top plan view similar to FIG. 4, in which the shade is extended out of the housings;

FIG. 6 is a partial cross sectional view taken along lines 6—6 of FIG. 2; and

FIG. 7 is a partial cross sectional view similar to FIG. 6, illustrating the operation of the extendible rain shield device.

DETAILED DESCRIPTION OF THE PREFERRED EMBODIMENT

Figure 1:
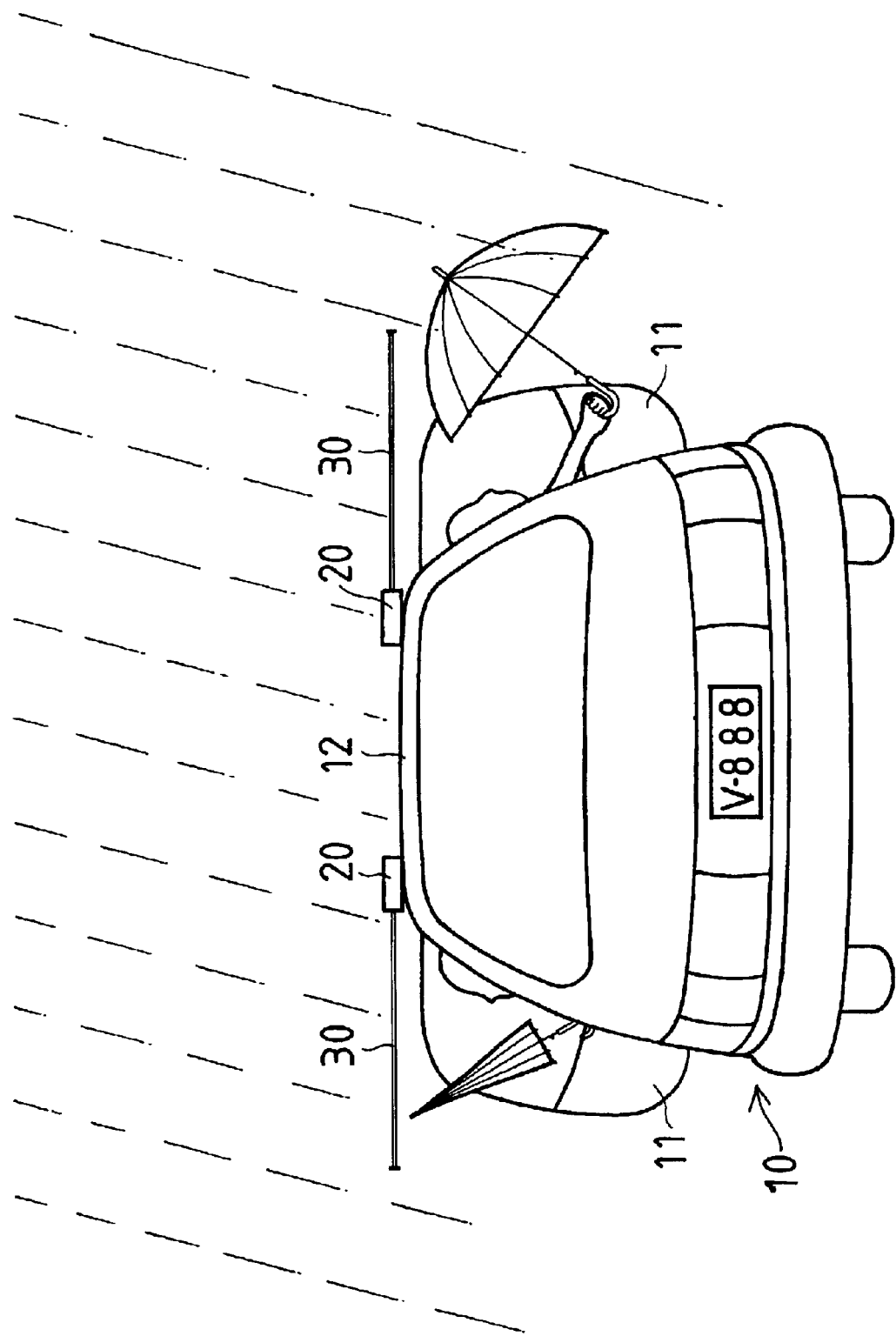
FIG. 1 is a rear view of a vehicle having two extendible rain shield devices in accordance with the present invention provided or disposed on top thereof, in which the shades are extended or opened out from housings respectively.
Figure 2:
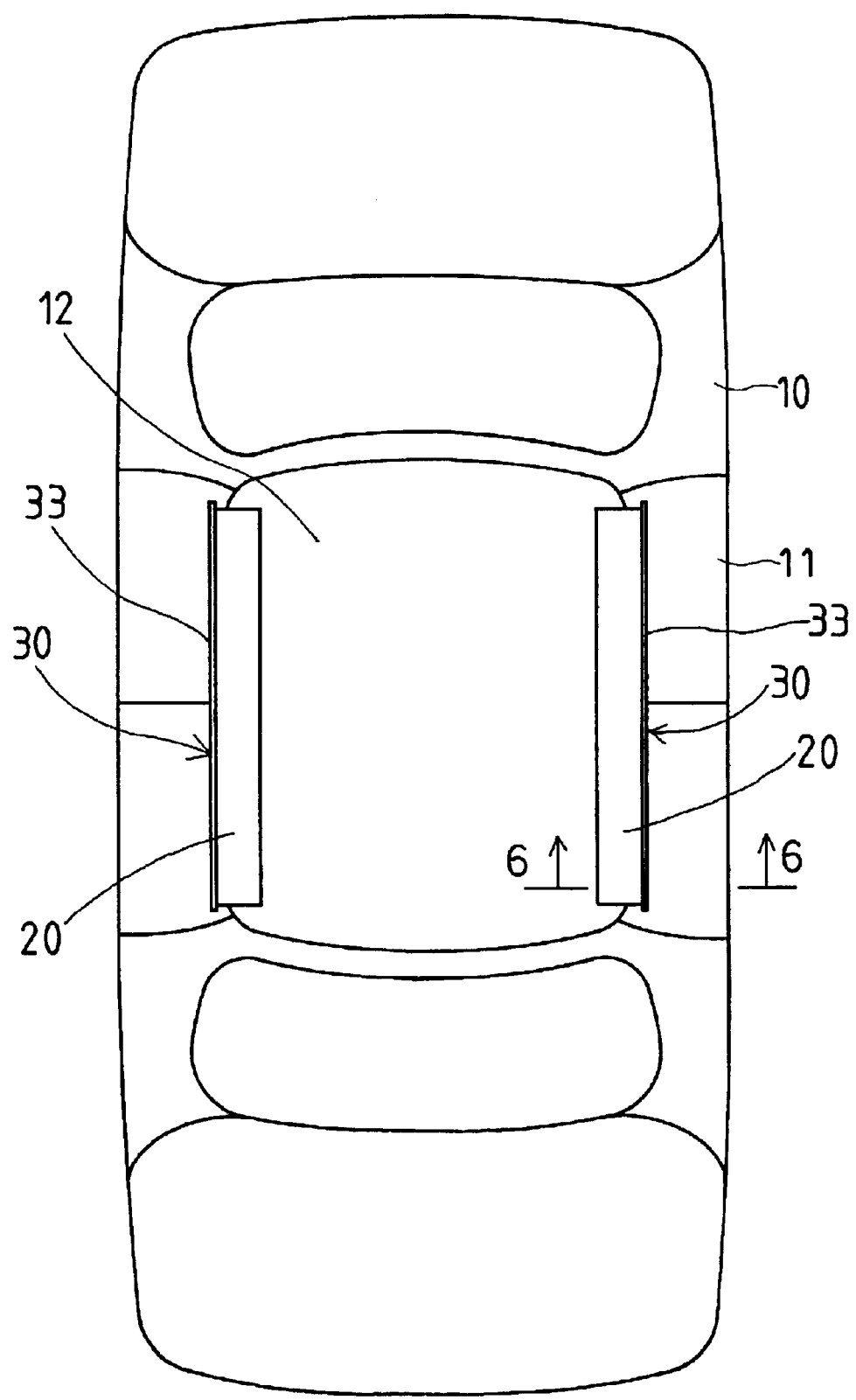
FIG. 2 is a top plan view of the vehicle having the two extendible rain shield devices provided or disposed on top thereof, in which the shades are received in the housings or have not be extended out of the housings.
Figure 3:
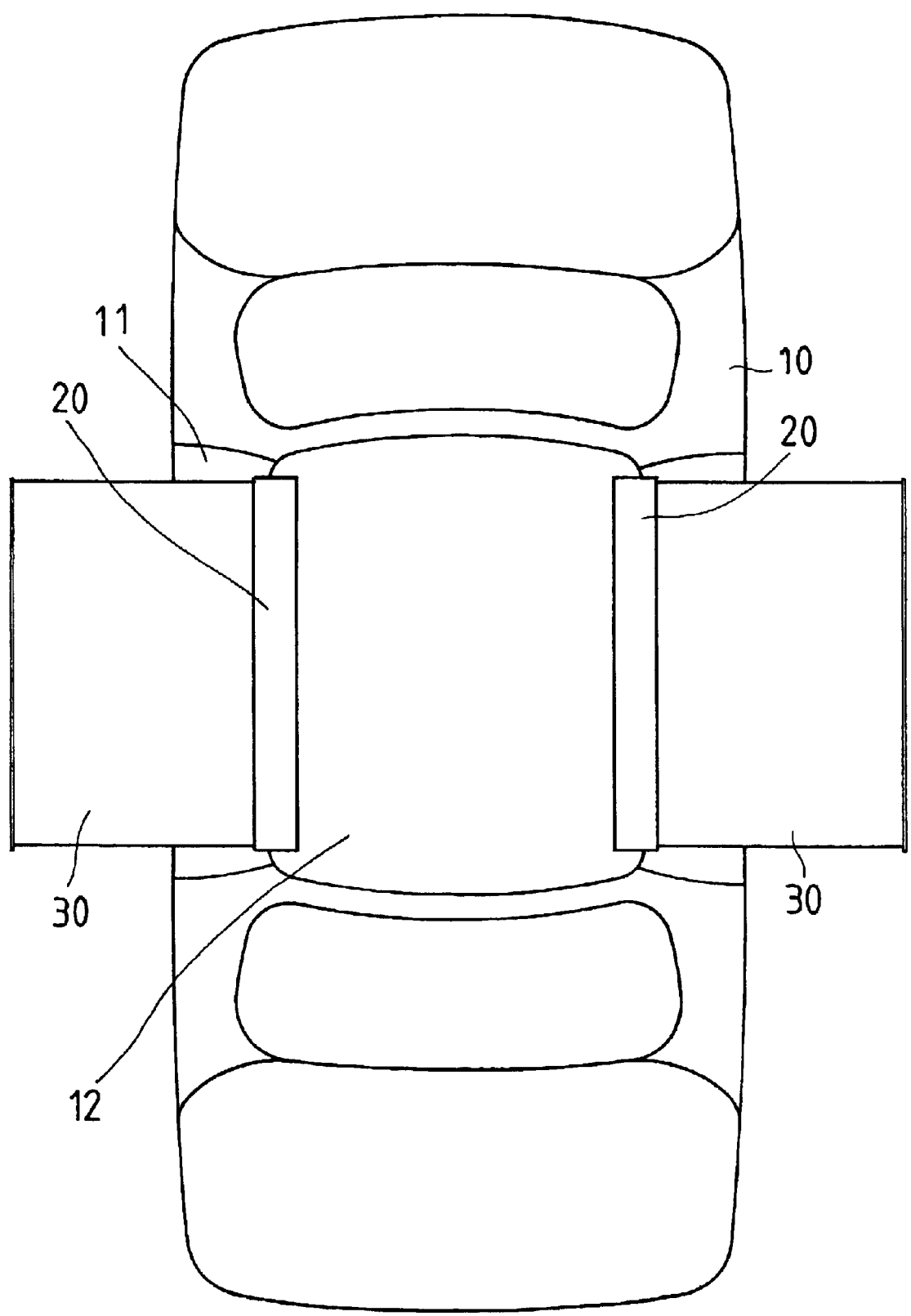
FIG. 3 is a top plan view similar to FIG. 2, in which the shades are are extended out of the housings.

Referring to the drawings, and initially to FIGS. 1–3, a extendible rain shield device in accordance with the present invention comprises a housing 20 attachable or securable onto the roof 12 of the vehicle 10 with fasteners, adhesive materials, or the like, and disposed above either of the doors 11 of the vehicle 10.

For example, as also shown in FIGS. 1–3, the extendible rain shield device includes a shield 30 extendible out of the housing 20 (FIGS. 1, 3), for shielding the upper portions of the doors 11 of the vehicles 10 or for shielding the rain while the drivers or the passengers are boarding or moving out of the vehicles.

Referring next to FIGS. 4–7, the housing 20 includes a channel or a groove 21 formed in the side portion thereof, for receiving the shield 30 and for allowing the shield 30 to be moved or received into the housing 20 or to be moved or extended out of the housing 20.

A spool or a shaft 22 is rotatably received in the housing 20, and preferably parallel to the groove 21 of the housing 20 for allowing the shield 30 to be wound and received onto the shaft 22, best shown in FIG. 6.

A motor 23 or the other driving devices may be disposed in the housing 20 and coupled to the shaft 22 with worms, pinions 28, 29, or the like, for rotating or driving the shaft 22 to receive or to wind the shield 30 around the shaft 22, and thus for storing the shield 30 within the housing 20, when required.

For example, the pinion 28 may be coupled to the shaft 22, and the other pinion 29 may be coupled to the motor 23 and engaged with the pinion 28, for allowing the shaft 22 to be rotated by the motor 23 via the pinions 28, 29.

Alternatively, the shaft 22 may also be a spring-biased shaft 22 for automatically rotating or winding the shield 30 onto or around the shaft 22.

Two racks 25 are slidably received or supported within the housing 20, and located in the opposite sides of the housing 20, and a gear 24 is rotatably received or supported within the housing 20 and engaged between the racks 25, for moving the racks 25 from the sides of the housing 20 to the opposite or the other sides of the housing 20.

The racks 25 are also preferably parallel to the shaft 22 and the groove 21 of the housing 20. Another motor 26 (FIGS. 6, 7) may further be provided and coupled to the gear 23 for rotating the gear 23 and thus for moving the racks 25 relative to the housing 20.

A rod 33 is further provided and attached or secured to the outer portion of the shield 30, and two brackets or couplers 31, 32 are secured to the rod 33 and spaced from each other. Two links 27 are coupled between the couplers 31, 32 and the racks 25 for moving the shield 30 out of the housing 20 when the racks 25 are moved from the sides of the housing 20 to the opposite sides of the housing 20.

Figure 4:
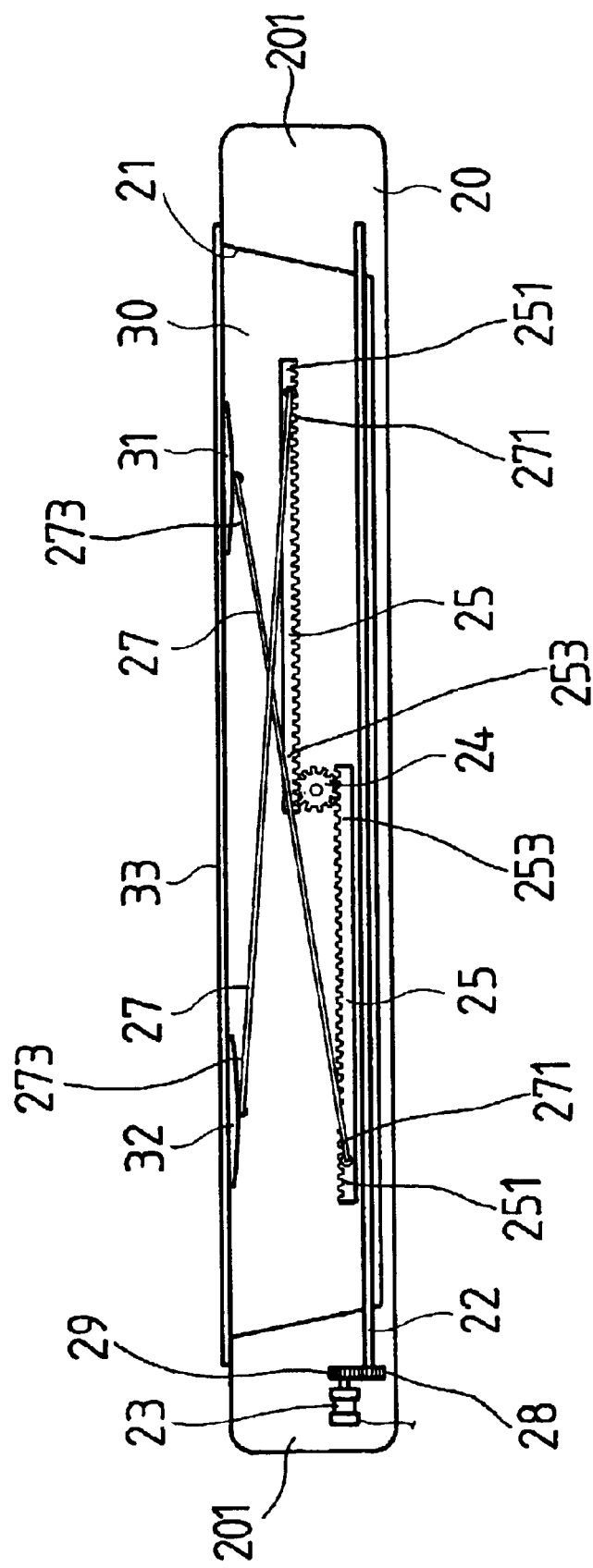
FIG. 4 is a top plan view of the extendible rain shield device, in which the shade is received in the housing or has not be extended out of the housings.

For example, as best shown in FIGS. 4 and 5, the links 27 may include one end 271 received in the housing 20 and pivotally or rotatably attached to one ends 251 of the racks 25 that are located closer to the ends 201 of the housing 20 (FIG. 4), and the other ends 273 pivotally or rotatably attached to the couplers 31, 32 distal to or opposite to the ends 251 of the racks 25 or the ends 201 of the housing 20.

At this moment, the links 27 are cross to each other, and both the links 27 and the shield 30 may be received in the housing 20. The other ends 253 of the racks 25 are located closer to the gear 24, at this moment.

As shown in FIG. 5, when the racks 25 are moved to the other sides of the housing 20 by the moving device including at least the gear 24 and the motor 26, the ends 251 of the racks 25 may be located closer to the gear 24, and the other ends 253 of the racks 25 may be located distal to the gear 24 and thus located closer to the ends 201 of the housing 20.

At this moment, the couplers 31, 32 and thus the rod 33 and the shield 30 may be moved out through the groove 21 of the housing 20 by the extending device including at least the link 27, in order to shield the upper portions of the doors 11 of the vehicles 10 and thus for shielding the rain for the drivers and the passengers.

It is to be noted that the housing 20 may be easily and readily attached onto various vehicles by fasteners, adhesive materials, or the like, and thus may be attached onto various vehicles by the users themselves.

The shaft 22 and the racks 25 and the gear 24 and the links 27 and the shield 30 may not be easily attached or engaged or assembled into the vehicles by the users themselves without the housing. In addition, it will be very difficult and space occupying to engage or to assemble the shaft 22 and the racks 25 and the gear 24 and the links 27 and the shield 30 into the vehicles.

Accordingly, the extendible rain shield device in accordance with the present invention for easily and readily attaching onto various vehicles, and includes a shade extendible outwardly from a housing for shielding the upper portions of the doors of the vehicles, and for shielding the rain while boarding or moving out of the vehicles, and for allowing the drivers and the passengers to easily open or receive the umbrella.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A rain shield device comprising:
    a housing for attaching onto vehicles, said housing including a groove formed therein,
    a shield including an outer portion, and
    means for extending said shield out through said groove of said housing, said extending means including a pair of links each having a first end attached to said outer portion of said shield and movable out of said housing, and a second end received in said housing, said extending means including a pair of racks slidably received in opposite sides of said housing, said second ends of said links are coupled to first ends of said racks respectively and located close to ends of said housing, said extending means further including means for moving said racks to the other sides of said housing and to move said links and said outer portion of said shield out of said housing.

2. The rain shield device according to claim 1, wherein said moving mans includes a gear engaged between said racks, and a motor coupled to said gear for rotating said gear to move said racks from housing ends to the other ends.

3. The rain shield device according to claim 1, wherein said housing includes a shaft rotatably received therein for winding and receiving said shield on said shaft.

4. The rain shield device according to claim 3 further comprising means for rotating said shaft to wind said shield onto said shaft.

5. The rain shield device according to claim 4, wherein said rotating means includes a motor coupled to said shaft and to rotate said shaft.

6. The rain shield device according to claim 5, wherein said rotating means includes a first pinion secured to said shaft, and a second pinion attached to said motor and engaged with said first pinion for said shaft by said motor via said first and said second pinions.

* * * * *